US009718939B2

(12) United States Patent
Svedberg et al.

(10) Patent No.: US 9,718,939 B2
(45) Date of Patent: Aug. 1, 2017

(54) METHOD AND A DEVICE FOR PREPARATION OF EXPANDED THERMOPLASTIC MICROSPHERES

(71) Applicant: Akzo Nobel Chemicals International B.V., Amersfoort (NL)

(72) Inventors: Lars-Olof Svedberg, Kvissleby (SE); Per Ajdén, Bergeforsen (SE)

(73) Assignee: Akzo Nobel Chemicals International B.V., Arnhem (NL)

( * ) Notice: Subject to any disclaimer, the term of this patent is extended or adjusted under 35 U.S.C. 154(b) by 0 days.

(21) Appl. No.: 14/425,460

(22) PCT Filed: Sep. 4, 2013

(86) PCT No.: PCT/EP2013/068218
§ 371 (c)(1),
(2) Date: Mar. 3, 2015

(87) PCT Pub. No.: WO2014/037361
PCT Pub. Date: Mar. 13, 2014

(65) Prior Publication Data
US 2015/0210820 A1 Jul. 30, 2015

Related U.S. Application Data

(60) Provisional application No. 61/697,997, filed on Sep. 7, 2012.

(30) Foreign Application Priority Data

Sep. 7, 2012 (EP) .................................. 12183419

(51) Int. Cl.
*C08J 9/228* (2006.01)
*B29C 44/34* (2006.01)
(Continued)

(52) U.S. Cl.
CPC ........... *C08J 9/228* (2013.01); *B29C 44/3415* (2013.01); *B29C 44/3461* (2013.01);
(Continued)

(58) Field of Classification Search
CPC .... C08J 2203/22; B29C 44/3461; F27B 7/06; F27B 7/00; F27B 7/08; F27B 7/16; F27B 7/18
See application file for complete search history.

(56) References Cited

U.S. PATENT DOCUMENTS 3,257,103 A 6/1966 Brockhues et al.
3,615,972 A 10/1971 Morehouse et al.
(Continued)

FOREIGN PATENT DOCUMENTS

EP 0486080 A2 5/1992
EP 0566367 A2 10/1993
(Continued)

OTHER PUBLICATIONS

European Search Report for EP No. 12183419.6 dated Mar. 25, 2013.
(Continued)

*Primary Examiner* — Mike M Dollinger
*Assistant Examiner* — Christina Wales
(74) *Attorney, Agent, or Firm* — McDonnell Boehnen Hulbert & Berghoff LLP

(57) ABSTRACT

The invention relates to a method of preparing expanded thermoplastic microspheres from thermally expandable thermoplastic microspheres comprising a polymer shell encapsulating a foaming agent, the method comprising heating the expandable microspheres within a flexible container (2) to effect expansion of said microspheres and withdrawing gas
(Continued)

from said flexible container (2). The invention further relates to an expansion device for preparing such expanded thermoplastic microspheres.

12 Claims, 1 Drawing Sheet

(51) Int. Cl.
    *C08J 9/00*           (2006.01)
    *B29K 105/00*       (2006.01)
    *B29K 105/04*       (2006.01)
    *B29K 67/00*         (2006.01)
    *B29K 77/00*         (2006.01)

(52) U.S. Cl.
    CPC ........ *C08J 9/0066* (2013.01); *B29K 2067/003* (2013.01); *B29K 2077/00* (2013.01); *B29K 2105/0076* (2013.01); *B29K 2105/048* (2013.01); *C08J 2203/22* (2013.01); *C08J 2300/00* (2013.01)

(56) References Cited

U.S. PATENT DOCUMENTS

| | | | |
|---|---|---|---|
| 3,945,956 A | 3/1976 | Garner | |
| 4,193,499 A | 3/1980 | Lookholder | |
| 4,272,469 A | 6/1981 | Smith | |
| 4,287,308 A | 9/1981 | Nakayama et al. | |
| 4,722,943 A * | 2/1988 | Melber | B01J 13/206 428/407 |
| 4,898,892 A * | 2/1990 | Melber | B01J 13/206 427/222 |
| 5,536,756 A | 7/1996 | Kida et al. | |
| 6,235,394 B1 | 5/2001 | Shimazawa et al. | |
| 6,235,800 B1 | 5/2001 | Kyuno et al. | |
| 2001/0051666 A1 | 12/2001 | Kron et al. | |
| 2002/0135084 A1 | 9/2002 | Ohmura et al. | |
| 2004/0176486 A1 | 9/2004 | Glorioso et al. | |
| 2005/0026067 A1 | 2/2005 | Masuda et al. | |
| 2005/0079352 A1 | 4/2005 | Glorioso et al. | |
| 2006/0080858 A1 * | 4/2006 | Maguire | F26B 5/042 34/406 |

FOREIGN PATENT DOCUMENTS

| | | |
|---|---|---|
| EP | 1061096 A1 | 12/2000 |
| EP | 1067151 A1 | 1/2001 |
| EP | 1230975 A1 | 8/2002 |
| EP | 1288272 A1 | 3/2003 |
| EP | 1598405 A1 | 11/2005 |
| EP | 1811007 A1 | 7/2007 |
| EP | 1964903 A1 | 9/2008 |
| GB | 1247950 | 9/1971 |
| GB | 2189711 A | 11/1987 |
| JP | 59/142122 A | 8/1984 |
| JP | S62286534 A | 12/1987 |
| JP | 2005272633 A | 10/2005 |
| WO | 02/096635 A1 | 12/2002 |
| WO | 2004/056547 A2 | 7/2004 |
| WO | 2004/056549 A1 | 7/2004 |
| WO | 2004/072160 A1 | 8/2004 |
| WO | 2007/091960 A1 | 8/2007 |
| WO | 2007/091961 A1 | 8/2007 |
| WO | 2007/142593 A1 | 12/2007 |

OTHER PUBLICATIONS

International Search Report for PCT No. PCT/EP2013/068218 date of mailing Nov. 19, 2013.

* cited by examiner

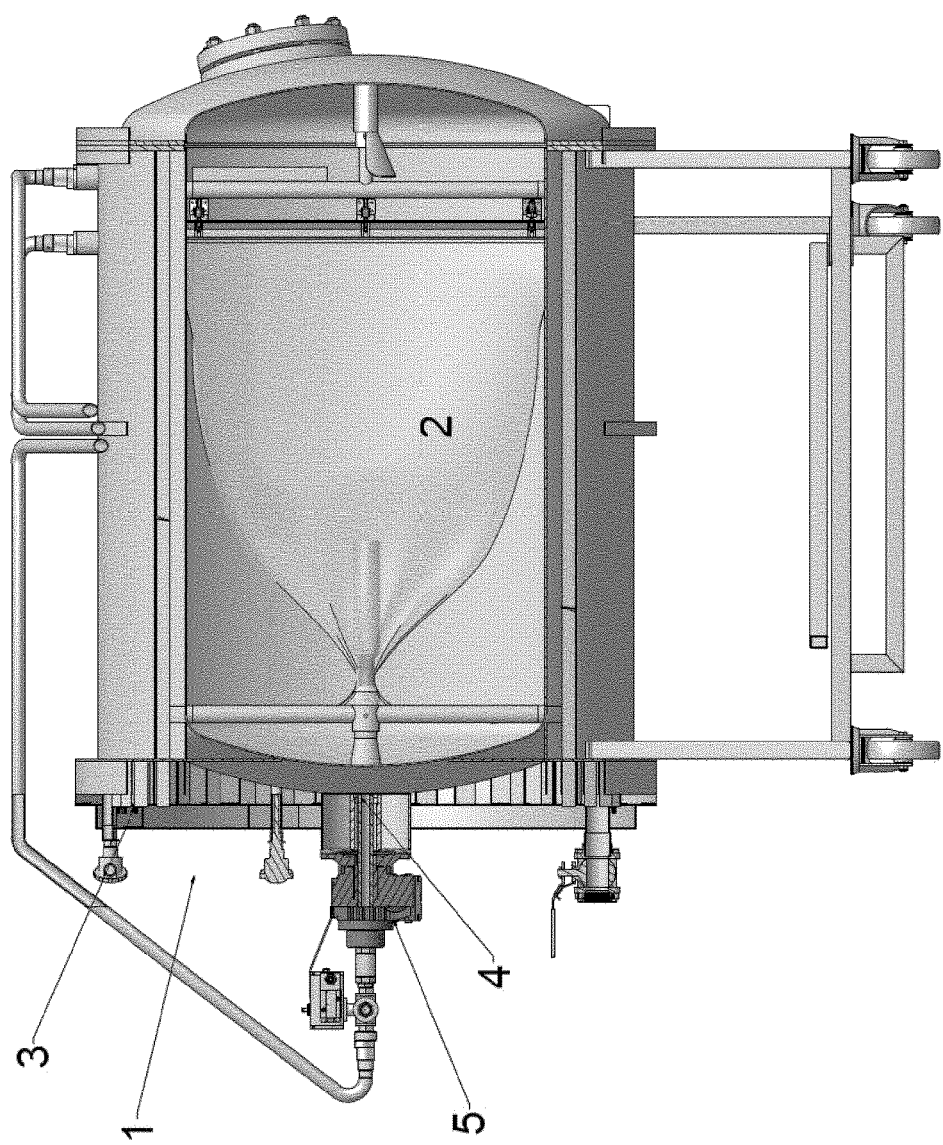

METHOD AND A DEVICE FOR PREPARATION OF EXPANDED THERMOPLASTIC MICROSPHERES

This application is a national stage filing under 35 U.S.C. §371 of PCT/EP2013/068218, filed Sep. 4, 2013, which claims priority to U.S. Provisional Patent Application No. 61/697,997 filed Sep. 7, 2012, and European Patent Application No. 12183419.6, filed Sep. 7, 2012, the contents of which are each incorporated herein by reference in their entireties.

The present invention relates to a method of producing expanded thermoplastic microspheres, and to a device for expanding such thermally expandable microspheres.

Thermally expandable thermoplastic microspheres are known in the art and described in detail in, for example, U.S. Pat. No. 3,615,972, EP 486080, EP 566367 and EP 1067151. In such microspheres a foaming agent is encapsulated within a thermoplastic shell. Upon heating, the foaming agent evaporates to increase the internal pressure, at the same time as the shell softens, resulting in significant expansion of the microspheres, normally from 2 to 5 times their diameter.

Thermoplastic microspheres can be used in various applications as unexpanded or pre-expanded. Examples of applications for pre-expanded microspheres are solvent based resins, like polyester, for dry spheres, and water based application systems, like paint, for wet spheres. However, transporting pre-expanded microspheres require significant space, for which reason the microspheres often are transported in unexpanded form to the end user and are expanded on-site.

WO 2004/056549 discloses a process and a device useful for on-site for preparation of expanded thermoplastic microspheres, wherein expandable microspheres are charged into an expansion device comprising rotating feeding means enveloped by a hollow body, and one or more scrapers. The process and expansion device works well but takes up significant space and requires comparatively complicated equipment.

U.S. Pat. No. 3,257,103 discloses a method and a device for expanding polystyrene beads in a container of steam permeable sieve elements.

It is an object of the invention to provide a method of preparing expanded thermoplastic microspheres in comparatively simple equipment not requiring extensive space and being easy to operate, thereby being suitable for use on-site where expanded microspheres are to be used and saving significant transport volumes. Furthermore, it is an object of the invention to provide a method of preparing expanded thermoplastic microspheres, which gives minimum of agglomeration, where the degree of expansion of the microspheres can be easily controlled to provide desired densities of expanded microspheres, particularly to obtain a narrow density distribution. It is also an object to provide a batch wise method in which it is easy to control the time and temperature cycles and where it is possible to control addition of additives to the microspheres, e.g. additives to be adhered to the surface thereof. It is a further object of the invention to provide an expansion device for preparing expanded thermoplastic microspheres, which suitable for the above-mentioned method.

According to the invention, it has surprisingly been found possible to achieve the above mentioned objects by a method of preparing expanded thermoplastic microspheres from thermally expandable thermoplastic microspheres comprising a polymer shell encapsulating a foaming agent, the method comprising heating the expandable microspheres within a flexible container to effect expansion of said microspheres, and withdrawing gas from said flexible container. Preferably the flexible container is made of a material impermeable to gas.

The invention further concerns an expansion device for preparing expanded thermoplastic microspheres comprising a flexible container made of a material impermeable to gas and means for heating the thermally expandable thermoplastic microspheres in the flexible containing to effect expansion of said microspheres, and means for withdrawing gas from said flexible container.

The flexible container is preferably made of a material that can withstand the temperatures during expansion without melting or breaking, preferably temperatures up to at least 100° C., most preferably up at least 150° C. and particularly at least 200° C. Useful materials include polymeric material such as polyamide, polyethylene terephthalate (PET) or other type of material with similar properties.

By the term "flexible" is meant something that may be bent or flexed without breaking.

By the term "flexible container" is meant a bag, a sack or anything equivalent thereto.

The term "material impermeable to gas" as used herein means that the diffusion rate of isobutane through the material is less than 4 g isobutane per minute and $m^2$ at a temperature of 150° C. and a pressure difference of 0.5 bar in partial pressure of isobutane. Preferably the diffusion rate at these conditions is less than 3 g per minute and $m^2$, most preferably less than 2 g per minute and $m^2$.

The method and the expansion device allow for a batch wise production of expanded thermoplastic microspheres, which can be easily controlled by adjusting the time and temperature during expansion thereof.

The method and the expansion device according to the invention can be used for all known kinds of expandable thermoplastic microspheres as defined herein, such as those marketed under the trademark Expancel®. Useful expandable microspheres are described in the literature, for example in U.S. Pat. Nos. 3,615,972, 3,945,956, 4,287,308, 5,536,756, 6,235,800, 6,235,394 and 6,509,384, 6,617,363 and 6,984,347, in US Patent Applications Publications US 2004/0176486 and 2005/0079352, in EP 486080, EP 1230975, EP 1288272, EP 1598405, EP 1811007 and EP 1964903, in WO 2002/096635, WO 2004/072160, WO 2007/091960, WO 2007/091961 and WO 2007/142593, and in JP Laid Open No. 1987-286534 and 2005-272633.

Suitable expandable thermoplastic microspheres typically have a thermoplastic shell made from polymers or co-polymers obtainable by polymerizing various ethylenically unsaturated monomers, which can be nitrile containing monomers, such as acrylonitrile, methacrylonitrile, alpha-chloroacrylonitrile, alpha-ethoxyacrylonitrile, fumaronitrile or crotonitrile; acrylic esters such as methylacrylate or ethyl acrylate; methacrylic esters such as methyl methacrylate, isobornyl methacrylate or ethyl methacrylate; vinyl halides such as vinyl chloride; vinylidene halides such as vinylidene chloride; vinyl esters such as vinyl acetate; styrenes such as styrene, halogenated styrenes or alpha-methyl styrene; dienes such as butadiene, isoprene and chloroprene; or other kinds of monomers such as vinyl pyridine. Any mixtures of the above mentioned monomers may also be used.

It may sometimes be desirable that the monomers for the polymer shell also comprise crosslinking multifunctional monomers, such as one or more of divinyl benzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra(meth)acrylate, pentaerythritol hexa(meth)acrylate, dimethylol tricyclodecane di(meth) acrylate, triallylformal tri(meth)acrylate, allyl methacrylate, trimethylol propane tri(meth)acrylate, trimethylol propane triacrylate, tributanediol di(meth)acrylate, PEG #200 di(meth)acrylate, PEG #400 di(meth)acrylate, PEG #600 di(meth) acrylate, 3-acryloyloxyglycol monoacrylate, triacryl formal or triallyl isocyanate, triallyl isocyanurate etc. If present, such crosslinking monomers preferably constitute from 0.1 to 1 wt %, most preferably from 0.2 to 0.5 wt % of the total amounts of monomers for the polymer shell. Preferably, the polymer shell constitutes from 60 to 95 wt %, most preferably from 75 to 85 wt %, of the total microsphere.

The softening temperature of the polymer shell, normally corresponding to its glass transition temperature ($T_g$), is preferably within the range from 50 to 250° C., or from 100 to 230° C.

The foaming agent encapsulated by the polymer shell in a microsphere is normally a liquid having a boiling temperature not higher than the softening temperature of the thermoplastic polymer shell. The foaming agent, also referred to as blowing agent or propellant, may be at least one hydrocarbon such as n-pentane, isopentane, neopentane, butane, isobutane, hexane, isohexane, neohexane, heptane, isoheptane, octane and isooctane, or any mixture thereof. Also, other hydrocarbon types may be used, such as petroleum ether, and chlorinated or fluorinated hydrocarbons, such as methyl chloride, methylene chloride, dichloro ethane, dichloro ethylene, trichloro ethane, trichloro ethylene, trichlorofluoro methane, etc. Particularly preferred foaming agents comprise at least one of isobutane, isopentane, isohexane, cyclohexane, isooctane, isododecane, and mixtures thereof. The foaming agent suitably makes up from 5 to 40 weight % of the microsphere.

The boiling point of the foaming agent at atmospheric pressure may be within a wide range, preferably from −20 to 200° C., most preferably from −20 to 150° C., and most preferably −20 to 100° C.

The thermally expandable thermoplastic microspheres are heated to effect expansion thereof. The temperature at which the expansion of the microspheres starts is called $T_{start}$, while the temperature at which maximum expansion is reached is called $T_{max}$, both determined at a temperature increase rate of 20° C. per minute. The thermally expandable microspheres used in the present invention suitably have a $T_{start}$ of from 60 to 200° C., preferably from 70 to 180° C., most preferably from 80 to 150° C. The thermally expandable microspheres used in the present invention suitably have a $T_{max}$ of from 50 to 300° C., preferably from 100 to 250° C., most preferably from 120 to 200° C.

The expandable microspheres preferably have a volume median diameter of from 1 to 500 µm, more preferably from 5 to 100 µm, most preferably from 10 to 70 µm, as determined by laser light scattering on a Malvern Mastersizer Hydro 2000 SM apparatus on wet samples. By heating to a temperature above $T_{start}$, it is normally possible to expand the microspheres from 2 to 5 times their diameter or more, preferably from 3 to 5 times their diameter.

According to the invention, gas is withdrawn from the flexible container, preferably during and/or after the expansion of the microspheres, ensuring that foaming agent leaking out from the microspheres do not form an explosive mixture with air in the flexible container. This can be done by use of sub-atmospheric pressure or vacuum. The gas may be withdrawn from the flexible container through a conduit, preferably provided with a filter through which the gas pass, thus preventing microspheres to be withdrawn together with the gas.

Preferably, the microspheres in the flexible container are agitated during the expansion, for example by rotating the container or stirring the microspheres in the container, or a combination thereof.

The expandable microspheres may also be pre-mixed, preferably prior to the expansion, with a dispersion agent that prevents agglomeration of the microspheres. Most preferably the expandable microspheres are pre-mixed with such a dispersing agent before entering the expansion device, but they may also be mixed with the dispersion agent within the expansion device.

A suitable dispersing agent is preferably in the form of fine, normally solid particles having a particle diameter range from 1 nm to 1 mm, preferably from 10 nm to 30 µm. Examples of dispersing agents are inorganic substances such as: aluminium powder, magnesium carbonate, magnesium phosphates, magnesium hydroxide, dolomite, calcium carbonate, calcium phosphates, calcium sulphate, talc, kaolin, silicon oxides, iron oxides, titanium oxide, titanium dioxide, aluminium oxides and hydroxides, zinc oxide, hydrotalcite, mica, barytes, glass spheres, fly ash, fine sand, mineral fibres and generally reinforcing fibres, wollastonite, feldspars, diatomaceous earth, pearlites, vermicullites, hollow quartz and ceramic spheres. Also organic compounds may be used, especially polymers with a sufficient high softening temperature, and cellulose, wood flour, carbon black, carbon fibres and graphite fibres. Preferably, the dispersing agent is a silicon oxide such as silicon dioxide (silica). Another preferred dispersing agent is titanium dioxide. The dispersing agent may be used in its pure form or it may be surface treated in different ways in order to increase the agglomerate preventing effect. One way of surface treating the dispersing agent is to make it hydrophobic. The weight ratio added dispersing agent to microspheres is depending on which dispersing agent is used, but in most cases it is suitably from 1:1000 to 5:1, preferably from 1:500 to 1:1, even more preferably from 1:100 to 1:3, and most preferably from 1:25 to 1:5. The amount of dispersing agent added may normally be in an amount from 1 to 20 wt %, preferably from 2 to 10 wt %, based on the total weight of the microspheres.

The density of the expanded microspheres is controlled by choosing a suitable heating temperature and/or length of time during which the microspheres are present in the expansion device. The temperature in the expansion device during expansion is suitably above $T_{start}$, preferably 5 to 150° C. above $T_{start}$, most preferably 20 to 50° C. above $T_{start}$. The average residence time of the microspheres in the expansion device is preferably from 30 s to 4 h, preferably from 1 minute to 100 minutes, most preferably from 1 minute to 20 minutes.

Both wet and dry thermally expandable microspheres can be used in the method and apparatus according to the invention. However, the invention is especially suitable for thermally expandable microspheres having a low moisture content. Suitably, the thermally expandable microspheres have a dry solids content of more than 50 weight %, preferably more than 80 weight %, most preferably more than 97 weight % (dry solids content is calculated after drying 2-3 g unexpanded Expancel® microspheres at 50° C. for 90 minutes).

The expansion device according to the invention comprises a flexible container as defined above. The means for heating the thermally expandable microspheres may be an oven, a furnace, a warming cupboard or a heating cabinet. It may also be any other type of means to increase the temperature thereof, for example a heated space in which the container is placed.

Preferably the expansion device further comprises means for withdrawing gas from the flexible container. Such means for withdrawing gas from the container may be a conduit provided with a filter and connected to the container. Said means may in turn be connected to a source for sub atmospheric pressure or vacuum to achieve withdrawal of gas from the container.

The expansion device further preferably comprises means for agitating the thermally expandable microspheres during expansion thereof. The means for agitating may be rotating means, for example by rotating the flexible container. It may also be stirring means, for example by stirring the expandable microspheres with a magnetic stirrer or other kind of stirrer in the flexible container.

The rate of rotation of the rotating means may, for example, be from 1 to 100 r.p.m, preferably from 5 to 90 r.p.m, most preferably from 7 to 30 r.p.m.

FIG. 1 is an illustration of an expansion device according to the present invention.

FIG. 1 shows an embodiment of an expansion device 1 of the present invention, which, however, is not limited to such an embodiment. Expandable microspheres are charged into a flexible container 2, such as a bag, for example made of polyethylene terephthalate or polyamide. The flexible container 2 containing the expandable microspheres is inserted into a means for heating 3 the microspheres to effect expansion thereof. The means for heating 3 the microspheres may be a furnace or any equivalent equipment. The microspheres are heated to a temperature sufficient for being to the desired density. The exact temperature depends on the grade of microspheres and may, for example, be from 100 to 250° C. or from 140 to 200° C.

The expansion device 1 further comprises means for withdrawing gas 4 from the flexible container 2. This means may, for example, be a conduit 4 connected to the flexible container and provided with a filter (not shown) preventing microspheres to be withdrawn together with the gas. The conduit 4 may in turn be connected to a source of vacuum, to withdraw gas from the flexible container 2. During expansion of the microspheres, small amounts of foaming agent (for example isobutane, isopentane and/or other kinds of hydro carbons) may be released, which may cause a risk for formation of an explosive mixture in the flexible container 2. By withdrawing gas from the container, this risk is significantly decreased.

The expansion device may further comprise agitating means 5. Such agitating means may be rotating means, rotating the flexible container with the microspheres during expansion. By agitating the microspheres during the expansion, the risk for agglomeration of the microspheres is diminished.

After completed expansion, most gas remaining in the bag is withdrawn. Then a small amount of air may be blown into the flexible container to free the filter from microspheres.

The flexible bag 2 is removed from the heating means and discharged from the means for withdrawing gas 4 and agitation 5, and may be brought to any point where the expanded microspheres are intended to be used.

EXAMPLES

The invention will be further described in connection with the following Examples which, however, are not to be interpreted to limit the scope of the invention. If not otherwise stated, all parts and percentages refer to parts and percent by weight.

Example 1

Expanded microspheres were prepared in a device as shown in FIG. 1 in accordance with the following procedure: 1.1 kg Expance® MI90 DUT 80 (expandable microspheres mixed with 15 wt % surface treated silica) was charged into a 200 liter bag of polyamide having a thickness of 40 μm. The bag was placed in an oven and connected to a conduit provided with a filter, by inserting the conduit into the bag. The container was rotated at 13 rpm during expansion to provide appropriate agitation. When the heating and expansion started, gas was withdrawn through the conduit. After 6 minutes at 152° C., expansion was completed and most gas remaining in the bag was evacuated. Then a small amount of air was blown into the bag to free the filter from expanded microspheres. Finally, the part of the bag where the conduit was connected was cut off and the bag with the expanded microspheres was brought to the application. The density of the obtained mixture was 15 kg/m$^3$.

Example 2

Example 1 was followed, except that 180 g of Expance® 461 DU 40 (expandable microspheres) was mixed with 829 g of TiO$_2$ to obtain a homogenous mixture. The mixture was placed in a bag as defined in Example 1, and expanded at 140° C. for 3.5 minutes. The rate of rotation during expansion was 13 rpm. The density of the obtained mixture was 97 kg/m$^3$.

Example 3

Example 1 was followed, except that 500 g of Expancel® 461 DU 40 (expandable microspheres) was mixed with 1500 g CaCO$_3$ to obtain a homogenous mixture. The mixture was placed in the bag as defined in Example 1 and expanded at 140° C. for 3.5 minutes. The rate of rotation during expansion was 13 rpm. The density of the obtained mixture was 113 kg/m$^3$.

The invention claimed is:

1. A method of preparing expanded thermoplastic microspheres from thermally expandable thermoplastic microspheres comprising a polymer shell encapsulating a foaming agent, the method comprising heating the expandable microspheres within a flexible container made of a material impermeable to gas to effect expansion of said microspheres, and withdrawing gas from said flexible container, and agitating said thermally expandable microspheres during the expansion, wherein the flexible container is a bag.

2. The method of claim 1 wherein the withdrawing of gas from said flexible container is through a conduit provided with a filter.

3. The method of claim 1 wherein the agitating is performed by rotating the flexible container during the expansion of the microspheres.

4. The method of claim 1 wherein the thermally expandable microspheres are pre-mixed with a dispersing agent to prevent agglomeration of said microspheres.

5. The method of claim 4 wherein said dispersing agent is silicon dioxide or titanium dioxide.

6. The method of claim 2 further comprising blowing gas through said filter to free it from microspheres after expansion is completed.

7. A method of preparing expanded thermoplastic microspheres from thermally expandable thermoplastic microspheres comprising a polymer shell encapsulating a foaming agent, the method comprising heating the expandable microspheres within a flexible container made of a material impermeable to gas to effect expansion of said microspheres, and withdrawing gas from said flexible container, and agitating said thermally expandable microspheres during the expansion, wherein the flexible container is a sack.

8. The method of claim 7 wherein the withdrawing of gas from said flexible container is through a conduit provided with a filter.

9. The method of claim 7 wherein the agitating is performed by rotating the flexible container during the expansion of the microspheres.

10. The method of claim 7 wherein the thermally expandable microspheres are pre-mixed with a dispersing agent to prevent agglomeration of said microspheres.

11. The method of claim 10 wherein said dispersing agent is silicon dioxide or titanium dioxide.

12. The method of claim 8 further comprising blowing gas through said filter to free it from microspheres after expansion is completed.

\* \* \* \* \*